US007086733B1

(12) United States Patent
Bac

(10) Patent No.: US 7,086,733 B1
(45) Date of Patent: Aug. 8, 2006

(54) THREE-PIECE SPECTACLE FRAME

(76) Inventor: Robert Bac, 110 Rue de Longchamp, Paris (FR) 75116

( * ) Notice: Subject to any disclaimer, the term of this patent is extended or adjusted under 35 U.S.C. 154(b) by 0 days.

(21) Appl. No.: 11/104,502

(22) Filed: Apr. 13, 2005

(51) Int. Cl.
*G02C 1/02* (2006.01)

(52) U.S. Cl. .................... 351/110; 351/140; 351/144
(58) Field of Classification Search ................ 351/110, 351/111, 140, 144, 147, 149
See application file for complete search history.

(56) References Cited

U.S. PATENT DOCUMENTS

| 5,847,800 | A | 12/1998 | Tachibana ............... 351/110 |
| 6,290,355 | B1 | 9/2001 | Chen ...................... 351/103 |
| 6,877,855 | B1 * | 4/2005 | Ng ......................... 351/110 |

FOREIGN PATENT DOCUMENTS

| DE | 202 07 372 | 8/2002 |
| EP | 0 718 660 | 6/1996 |
| FR | 2 711 810 | 5/1995 |
| FR | 2 748 128 | 10/1997 |
| WO | WO 96 12983 | 5/1996 |

* cited by examiner

*Primary Examiner*—Huy Mai
(74) *Attorney, Agent, or Firm*—Young & Thompson

(57) ABSTRACT

The spectacle frame has two branches each suitable to be mounted on one distinct from two organic lenses by one of its ends forming a hinge and a bridge suitable to be mounted between the two lenses, a portion of the branches and/or of the bridge including an attachment element penetrating into a blind hole made in the edge of the lenses and bonded in place by an adhesive. The attachment element affects only one point of the edge and is formed of a tongue having a zone intended to penetrate into the blind hole, the penetration zone being of polygonal cross section and including at least one relief for anchoring in the adhesive.

12 Claims, 3 Drawing Sheets

Figure 3:
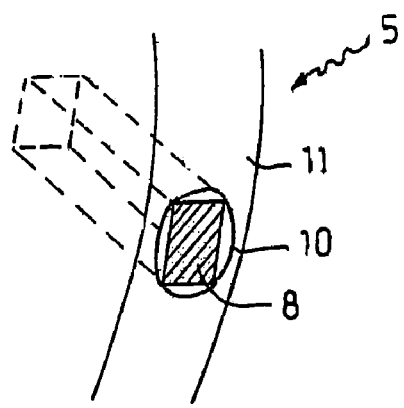

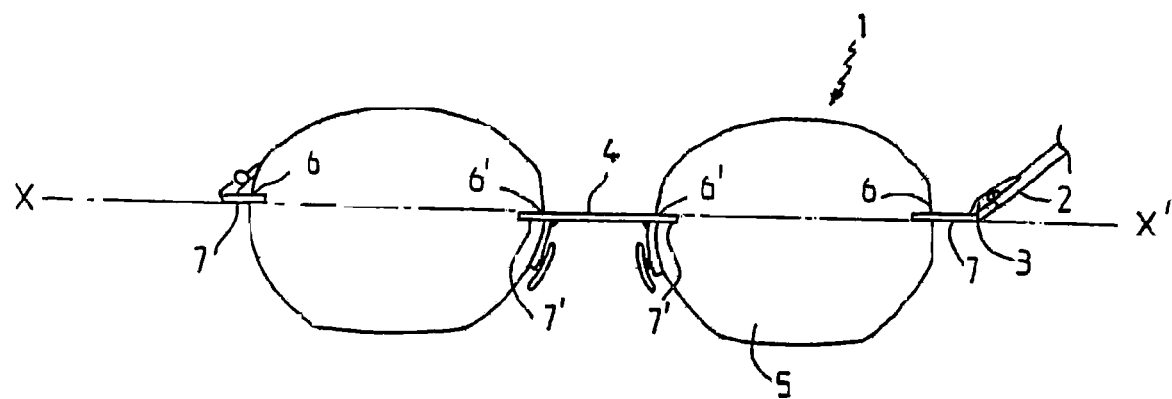
FIG 1
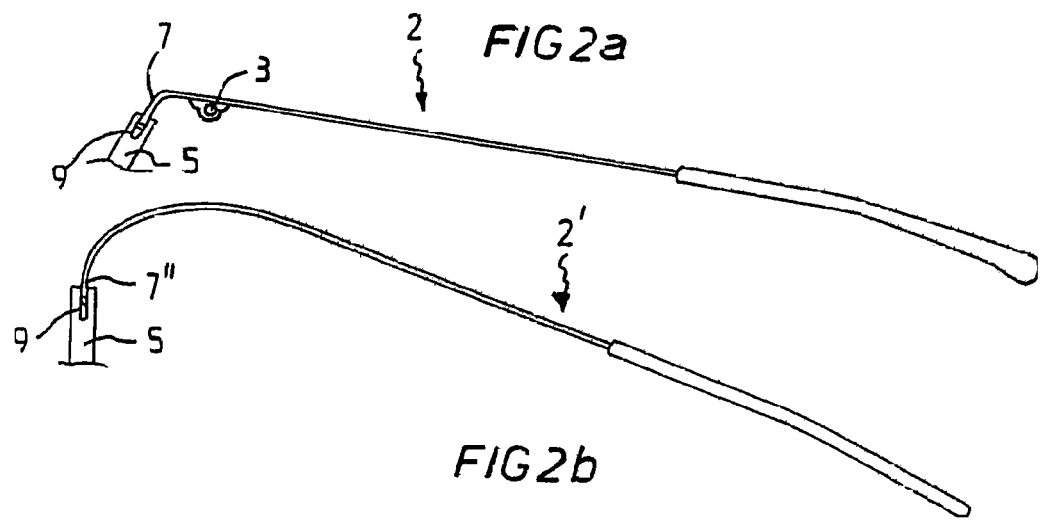
FIG 2a
FIG 2b

THREE-PIECE SPECTACLE FRAME

The present invention relates to a so-called "three-piece" spectacle frame.

More precisely, it relates to a frame which, in conventional manner, comprises two branches each suitable to be mounted on one distinct from two organic lenses by one of its ends forming a hinge, and a bridge suitable to be mounted between the two lenses, a frame which belongs to the type in which a portion of the branches and/or of the bridge comprises an attachment means penetrating into a blind hole made in the edge of the lenses and bonded in place by means of an adhesive.

A frame of this type is known according to EP-B-0 787 314 of the Applicant, a patent which provides for the use of a fastening lug engaging with the edge of the lens over 5–10 mm and provided with at least one spur capable of penetrating into a blind hole made in the edge of the lenses and of being bonded in place therein.

Although these frames have the advantage of being light and discreet thanks to attachment means which avoid the encirclement of the periphery of the lenses without, for all that, having to traverse the lenses from the front face to the rear face, they have the disadvantage of requiring a particular expertise of the optician who mounts the lenses. Specifically, although EP-B-0 787 314 provides that the fastening lug that engages over 5–10 mm with the edge of the lens may comprise only one spur penetrating into the edge of the lens, in practice, two spurs are used to prevent the frame from "turning". The result is that each attachment point requires the piercing of two holes in the edge of the lens, with a dual difficulty: maintaining the spacing and maintaining the parallelism of the two spurs. Without an ability or particular technical means of assistance, the operation frequently ended in the breakage of the lens.

It has now been ascertained, in a completely unexpected manner, that it was not essential to cause the attachment to interact with 5–10 mm of the edge of the lens and that a single penetration in the edge of the lens for each attachment could be sufficient, provided that the geometry of the attachment piece is appropriately designed.

Thus, according to the invention, the attachment means affects only one point of the edge of the lens and it consists of a tongue comprising a zone intended to penetrate into the blind hole made in the edge of the lens, the said penetration zone being of polygonal cross-section and comprising at least one relief for anchoring in the adhesive.

Thanks to this arrangement, the number of holes to be drilled in the edge of the lens is halved and the difficulty of the piercing, per attachment, of two holes strictly parallel and at a precise spacing, is eliminated.

To ensure that the tongue is reliably secured in the blind hole, the penetration zone must have corrugations in which the adhesive will settle, forming as many anchoring points.

In a first embodiment, the corrugation that forms the anchoring relief consists of at least one groove made in the penetration zone, in a plane orthogonal to the longitudinal axis of the said blind hole.

It is understood that, when the grooved zone penetrates the blind hole previously coated with adhesive, the adhesive flows into the groove or grooves and, when it sets, it immobilizes the tongue in place in the blind hole.

In another possible embodiment, the anchoring relief consists of a barb made in the penetration zone, a barb which is oriented to resist extraction from the blind hole, once the tongue is bonded in place.

Preferably, the blind hole is of circular cross section and its diameter is such that the said circular cross section circumscribes the polygonal cross section of the said penetration zone, but for the clearance necessary for penetration.

This configuration ensures a guidance of the tongue when it penetrates into the blind hole.

In a preferred embodiment, the sides of the polygonal cross section of the penetration zone have an approximate length lying between $5/10$ and $15/10$ mm.

In a preferred embodiment, the cross section of the penetration zone has the shape of a rectangle parallelogram, which may be square or rectangular.

Better still, the cross section in a rectangle parallelogram is rectangular with a width of approximately $7/10$ mm and a length of approximately $12/10$ mm.

In any case, it is desirable for the penetration zone to have a length lying between 10 and $60/10$ mm.

In one embodiment, the tongue may be made in one piece with the portion of the branches and/or of the bridge, which simplifies the production of the frame by reducing the number of pieces to be assembled.

Thus, the tongue may consist of a terminal portion of a hinge lug.

However, in an embodiment that is particularly lightweight, discreet and aesthetic, the tongue consists of a terminal portion of a branch without a hinge. In this case, it is the branch itself which penetrates into the edge of the lens.

The invention also relates to spectacles incorporating such frames.

The invention will be further detailed hereinafter, with reference to the appended drawings in which:

FIG. 1 is an overview of a spectacle frame according to the invention

Figure 4A:
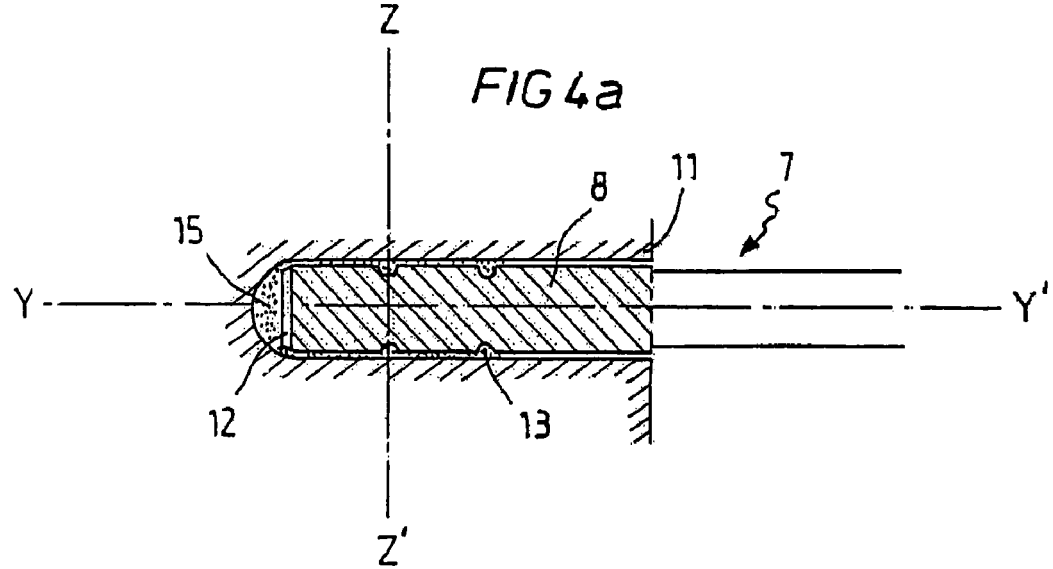
Figure 4B:
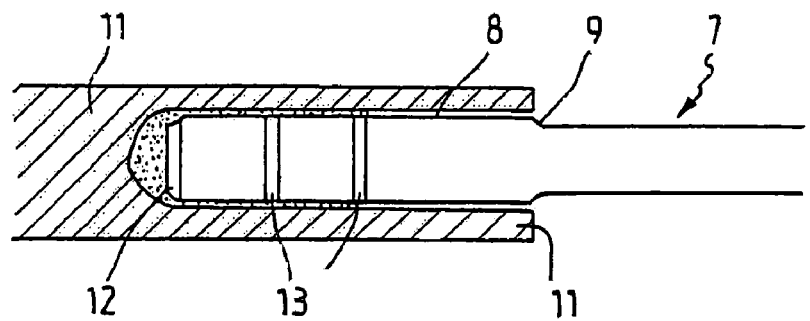
Figure 5:
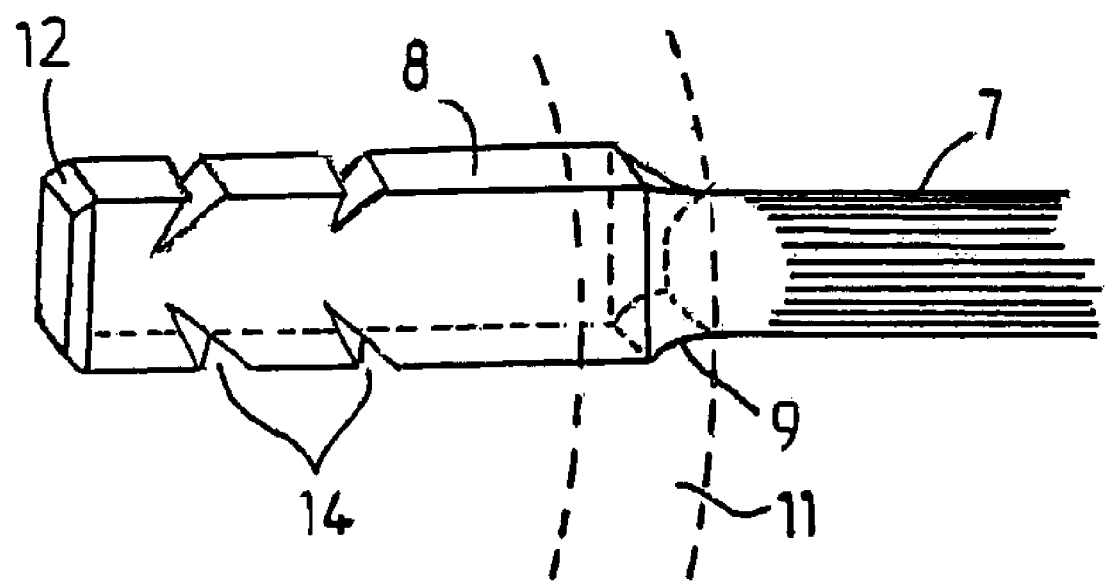

FIGS. 2a and 2b are schematic representations of two types of branches according to the invention FIG. 3 is a schematic section taken level with the edge of a spectacle lens mounted according to the invention FIGS. 4a and 4b are respectively a view in section in the plane of the lens and a view in partial section transverse to the plane of the lens, of a first embodiment of the tongue, and FIG. 5 is a schematic view of another embodiment of the tongue.

FIG. 1 represents a spectacle frame 1 comprising two branches 2, each mounted pivotingly on a cylindrical hinge 3, and a bridge 4. The branches 2 are attached to each of the lenses 5 by a tongue 7 which penetrates into the edge of the lenses, at the point 6 in the left lens and in symmetrical manner in the right lens. The bridge 4 also comprises a pair of tongues 7' which penetrate into the edge of the lenses at 6'. The tongues 7 of the two branches 2 and the tongues 7' of the bridge 4, and the bridge itself, are aligned on the same longitudinal axis X–X'.

FIG. 2a is a view in perspective of the branch 2. It contains the hinge 3 and the tongue 7 which, in fact, is a cranked extension of the lug of this hinge 3. FIG. 2b shows a variant embodiment of the branch. This time, the branch 2' comprises no hinge: it is made of a material such as titanium or a titanium alloy with a shape memory and the tongue 7" is the terminal portion of the branch itself.

The structure of the tongue 7 emerges more clearly in FIGS. 4a and 4b (it being understood that the tongue 7" may be of the same structure). As can be seen, the tongue 7 comprises a zone 8 suitable for penetrating into a blind hole 10 pierced in the edge 11 of the lens 5. The penetration zone 8 of the tongue 7 has a rectangular cross section (see FIG. 3) and it is separated from the remaining portion of the tongue 7, of smaller cross section, by a collar 9. Its free end 12 is bevelled. The longitudinal faces of the penetration zone 8 of the tongue 7 have, in a particular embodiment, two pairs of grooves 13 made in a plane Z–Z' orthogonal to the longitudinal axis Y–Y' of the blind hole 10. These grooves 13 have, preferably, a width of $1/10$ to $2/10$ mm and a depth of $1/10$ to $2/10$ mm.

As emerges from FIG. 3, the circular blind hole 10 pierced in the edge 11 of the lens 5 has a diameter such that its cross section circumscribes the cross section of the penetration zone 8 of the tongue 7, but for the penetration clearance. Preferably, for a penetration zone 8 having a rectangular cross section of $7/10$ mm by $12/10$ mm, the diameter of the blind hole is approximately $12.2/10$ mm.

For the assembly, the optician pierces the blind hole 10, coats it with adhesive 15 and inserts the said penetration zone 8 into the hole ensuring that he orients the branch appropriately. The adhesive then insinuates itself into the grooves 13, thus fixing the penetration zone 8 of the tongue 7 in the blind hole 10. The optician may also, before inserting the tongue 7 into the blind hole 10, coated with adhesive, cover the penetration zone 8 also with adhesive to ensure that the grooves 13 are filled. A cyanoacrylic glue for example may be used as the adhesive.

FIG. 5 schematizes a variant embodiment of the penetration zone 8 of a tongue 7 inserted into a blind hole 10. Instead of a pair of grooves, this time a pair of barbs 14 is provided. These barbs 14, like the grooves 13, are filled by the adhesive which, once set, prevents the tongue 7 from being extracted from the blind hole 10.

I claim:

1. Spectacle frame comprising two branches each suitable to be mounted on one distinct from two organic lenses by one of its ends forming a hinge and a bridge suitable to be mounted between the said two lenses, a portion of the said branches and/or of the said bridge comprising an attachment means penetrating into a blind hole made in the edge of the said lenses and bonded in place by means of an adhesive, wherein the said attachment means affects only one point of the said edge and is formed of a tongue comprising a zone intended to penetrate into the said blind hole, the said penetration zone being of polygonal cross section and comprising at least one relief for anchoring in the said adhesive.

2. Frame according to claim 1, wherein the said penetration zone has a cross section in a rectangle parallelogram shape.

3. Frame according to claim 1, wherein the said anchoring relief consists of at least one groove made in the said penetration zone, in a plane orthogonal to the longitudinal axis of the said blind hole.

4. Frame according to claim 1, wherein the said anchoring relief consists of a barb made in the said penetration zone, a barb which is oriented to resist extraction from the blind hole, once the tongue is bonded in place.

5. Frame according to claim 1, wherein the said blind hole is of circular cross-section and in that its diameter is such that the said circular cross section circumscribes the polygonal cross-section of the said penetration zone, but for the clearance necessary for penetration.

6. Frame according to claim 1, wherein the sides of the polygonal cross section of the penetration zone have an approximate side length lying between $5/10$ and $15/10$ mm.

7. Frame according to claim 1, wherein the said polygonal cross section is rectangular and has a width of approximately $7/10$ mm and a length of approximately $12/10$ mm.

8. Frame according to claim 1, wherein the said penetration zone has a length lying between 10 and $60/10$ mm.

9. Frame according to claim 1, wherein the said tongue is made in one piece with the said portion of the said branches and/or of the said bridge.

10. Frame according to claim 1, wherein the said tongue consists of a terminal portion of a hinge lug.

11. Frame according to claim 1, wherein the said tongue consists of a terminal portion of a branch without a hinge.

12. Spectacles incorporating a frame according to claim 1.

* * * * *